(12) United States Patent
Maliah et al.

(10) Patent No.: US 7,570,429 B2
(45) Date of Patent: Aug. 4, 2009

(54) HEAD UP DISPLAY MECHANISM

(75) Inventors: Eyal Maliah, Rehovot (IL); Shahar Hertz, Rehovot (IL); Anatoly Gelman, Lod (IL)

(73) Assignee: Elbit Systems Electro-Optics Elop Ltd., Rehovot (IL)

( * ) Notice: Subject to any disclaimer, the term of this patent is extended or adjusted under 35 U.S.C. 154(b) by 0 days.

(21) Appl. No.: 11/595,501

(22) Filed: Nov. 9, 2006

(65) Prior Publication Data

US 2007/0183055 A1 Aug. 9, 2007

(30) Foreign Application Priority Data

Nov. 10, 2005 (IL) ...................................... 171880
Nov. 8, 2006 (IL) ...................................... 179135

(51) Int. Cl.
G02B 27/14 (2006.01)
(52) U.S. Cl. ........................................ 359/630; 359/632
(58) Field of Classification Search .................. 359/13, 359/629–634; 345/7; 340/980; 348/115; 353/13; 349/11
See application file for complete search history.

(56) References Cited

U.S. PATENT DOCUMENTS

| | | | |
|---|---|---|---|
| 4,108,407 A * | 8/1978 | Cable et al. ................. | 248/656 |
| 5,381,267 A | 1/1995 | Woody | |
| 5,652,751 A | 7/1997 | Sharony | |
| 6,078,428 A | 6/2000 | Rambert et al. | |
| 6,301,053 B1 | 10/2001 | Cheesman | |
| 6,618,203 B2 | 9/2003 | Nakamura et al. | |
| 6,744,740 B2 | 6/2004 | Chen | |
| 6,807,165 B2 | 10/2004 | Belcea | |
| 6,816,460 B1 | 11/2004 | Ahmed et al. | |
| 2002/0114286 A1 | 8/2002 | Iwamura et al. | |
| 2007/0019297 A1* | 1/2007 | Stewart et al. .............. | 359/630 |
| 2007/0093832 A1* | 4/2007 | Abdelgany .................. | 606/61 |

OTHER PUBLICATIONS

Guba, Nalinrat Krittiyanot and Camp, Tracy; "GLS: A Location Service For An Ad Hoc Network" Computer Sciences, Colorado School of Mines, Golden, Colorado, published before Nov. 9, 2006.
Pei, Guangyu, Gerla, Mario and Hong, Xiaoyan; "Lanmar: Landmark Routing For Large Scale Wireless Ad Hoc Networks With Group Mobility" Computer Science Department, University of California, Los Angeles, California, published before Nov. 9, 2006.

* cited by examiner

Primary Examiner—Jessica T Stultz
Assistant Examiner—Mahidere S Sahle
(74) Attorney, Agent, or Firm—Lathrop & Gage LLP

(57) ABSTRACT

A Head up display (HUD) calibration assembly is designed for coupling a HUD system with the inner walls of a vehicle, and adjusting the orientation of the HUD system. The HUD calibration assembly includes a mounting tray for coupling with a HUD projector and with a HUD combiner deployment mechanism. The mounting tray includes a plurality of adjustment interface planes, each of which includes a locking screw opening, and a plurality of adjustment assemblies, each coupled with the vehicle in a respective separate anchoring location, locking the mounting tray at the desired position and orientation.

3 Claims, 10 Drawing Sheets

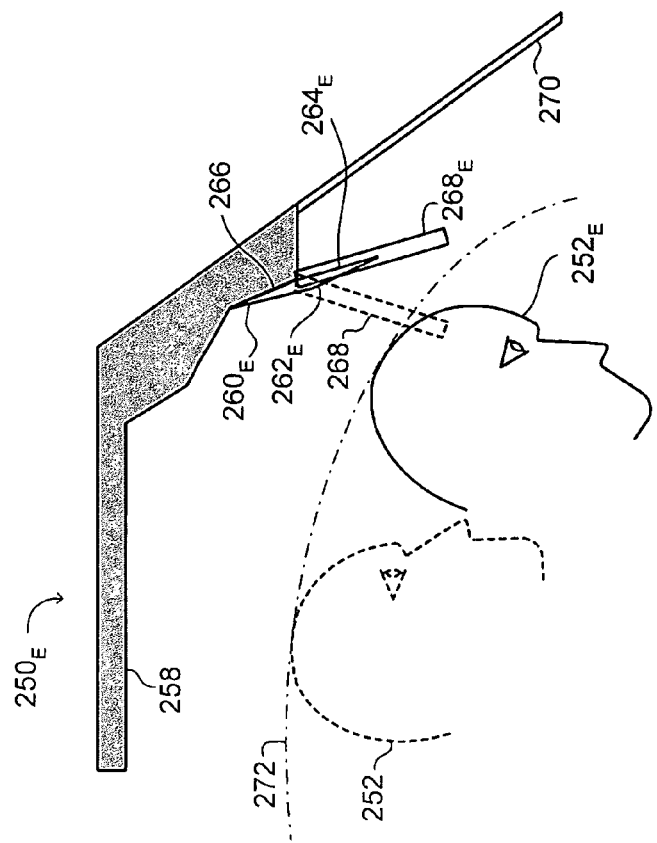
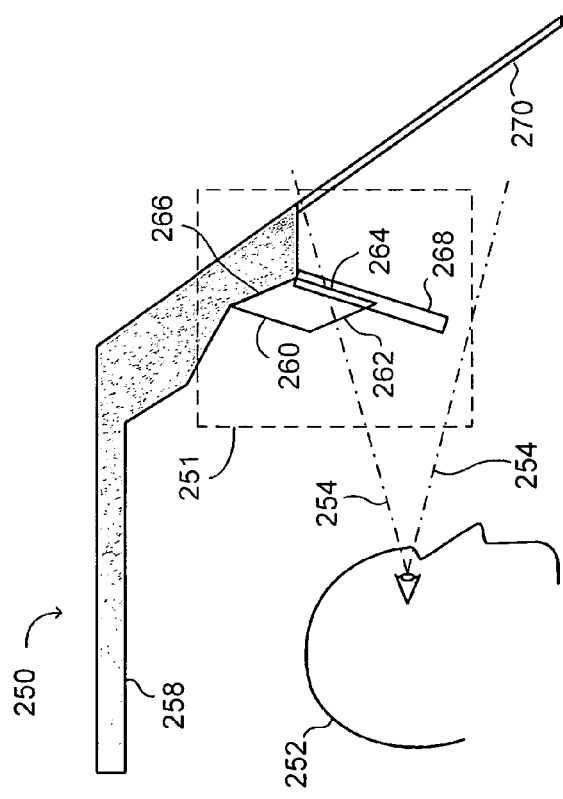
FIG. 2B
FIG. 2A

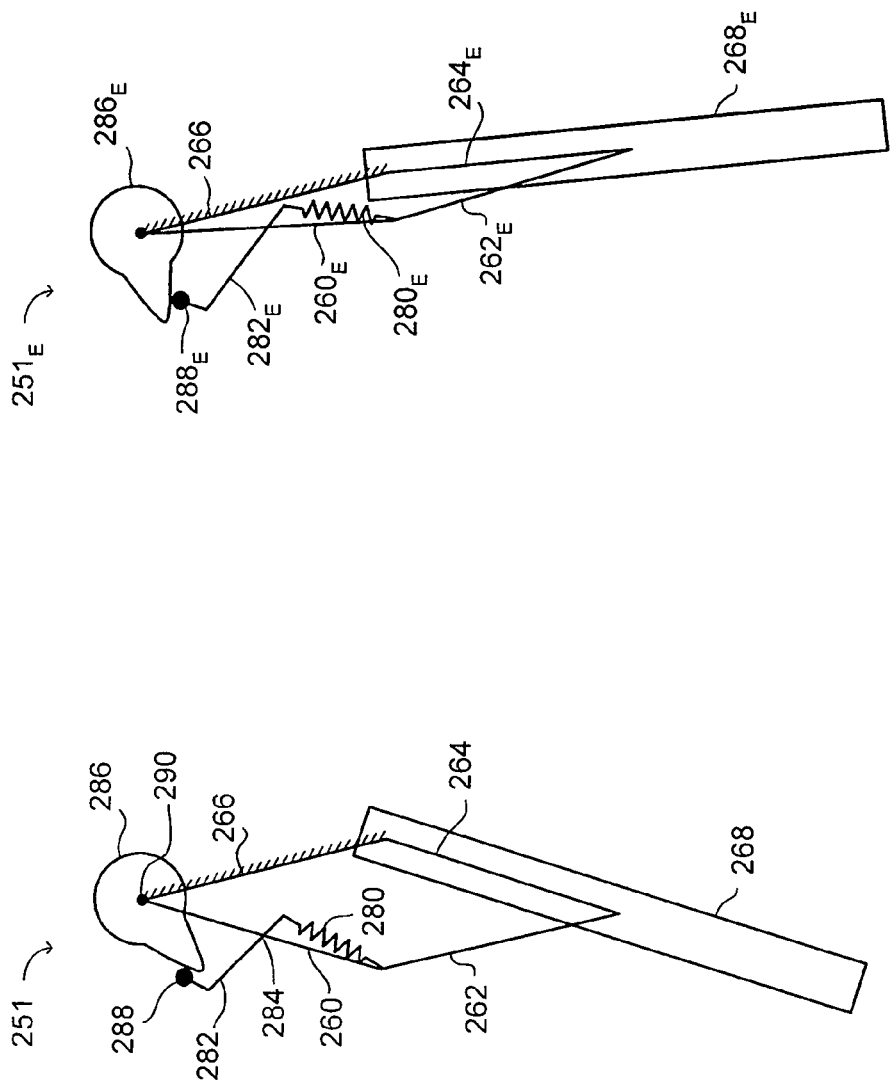

HEAD UP DISPLAY MECHANISM

RELATED APPLICATIONS

This application claim benefit of Israeli Patent Application No. 171880, Filed Nov. 10, 2005 and also claims benefit of Israeli Patent Application No. 179135, filed Nov. 8, 2006, the disclosures of which are herein incorporated by reference.

FIELD OF THE DISCLOSED TECHNIQUE

The disclosed technique relates to optical devices, in general, and to head-up-displays, in particular.

BACKGROUND OF THE DISCLOSED TECHNIQUE

In vehicle operation, a vehicle operator needs to obtain different information regarding the vehicle, such as speed, RPM, fuel level, navigation, and the like.

A head-up display (HUD) system is mounted inside the vehicle, and is used for visually presenting such information to the vehicle operator. In the HUD, this information is projected, typically using an image source (IS), onto an optical combiner, which is a semi-reflecting glass, set to reflect light rays projected thereon, and to transmit light rays passing there through. The optical combiner is placed in the field of view of the vehicle operator, between the vehicle operator and the vehicle front window.

The optical combiner reflects the projected visual information to the vehicle operator, while passing through or transmitting the outside scene view coming through the front window. This way, the vehicle operator observes the scene in front of the vehicle clearly, and also sees the vehicle related information on the optical combiner. When the HUD is not in use, the optical combiner is moved to a position, where it is out of the viewing path of the vehicle operator.

In the vehicle, a state of emergency may occur, when the vehicle is traveling forward, and suddenly decelerates. Such emergency states are, for example, a rough landing of an aircraft, a rapid breaking of a car, or an impact with another vehicle. When the vehicle moves forward, and decelerates, the vehicle operator naturally accelerates forward. If a HUD, which is mounted in the vehicle, is in an operating position, and the optical combiner is located in front of the head of the vehicle operator, there is an immediate danger of injury to the vehicle operator, by impacting the optical combiner.

When a HUD system is to be installed in a vehicle (e.g., an aircraft), the projector should be adjusted with respect to the optical combiner, such that projected images shall be aligned with the outside view of the vehicle operator (e.g., the pilot). For this purpose, a telescope is positioned in place of the projector. The position and orientation of the telescope is then adjusted, according to a target image placed in front of the vehicle. Once the desired orientation is achieved, the telescope is removed, and instead the projector is positioned in the same orientation. It is thus desirable to maintain the orientation of the telescope, when positioning the projector, in order to assure proper operation of the HUD. Methods for maintaining the desired orientation when positioning the projector are known in the art.

HUD assemblies are known in the art, and include mechanisms for moving the optical combiner between an operating position and a retracted position, as well as mechanisms for preventing injury to the vehicle operator in emergency situations.

U.S. Pat. No. 5,381,267 issued to Woody, and entitled "Moveable Head-Up-Display (HUD) Combiner Assembly Including Locking Linkage Mechanism", is directed to a HUD combiner assembly, which includes a four bar linkage for supporting a HUD combiner for movement between an upper storage position and a lower operating position. The HUD assembly is mounted inside an aircraft. The HUD assembly includes a combiner and a four bar linkage. The four bar linkage includes a first fixed link, a second moveable link, a third moveable link, a fourth connecting link and a handle.

The optical combiner is fixedly connected to the third moveable link of the four bar linkage. One end of the fixed link of the four bar linkage is fixedly connected to the ceiling of the aircraft, in which the HUD is mounted. The other end of the fixed link is pivotally connected to one end of the second moveable link. The second movable link is further pivotally connected to one end of the connecting link. The other end of the connecting link is pivotally connected to the third moveable link. The third moveable link is further pivotally connected to the first fixed link. The handle is attached to the second movable link.

When the combiner is in a storage position, the pilot of the aircraft pulls the handle downward. This causes the second moveable link to rotate clockwise, and the connecting link to rotate counter-clockwise. After the second moveable link and the connecting link rotate a predetermined amount relative to the storage position, the third moveable link is also set to rotate clockwise. The pilot pulls the handle further downward, until the combiner reaches the operating position. As the operating position is reached, the assembly is locked in place, using a locking mechanism. The locking mechanism is also used to release the assembly from the operating position, and locking it in the storage position.

U.S. Pat. No. 6,301,053 B1 issued to Cheesman, and entitled "Combiner Assemblies", is directed to an assembly for mounting an optical combiner as a head up display, on the roof structure of an aircraft flight deck. The combiner assembly includes an optical combiner, a housing and a mounting assembly. The mounting assembly includes a first arm, a second arm, a first release mechanism and a second release mechanism.

The optical combiner is pivotally attached to one end of the first arm and to one end of the second arm, at two different pivot points. The other end of the first arm and the other end the second arm are pivotally attached to the housing, at two different pivot points. The first release mechanism and the second release mechanism are mounted on the first arm. The pivot points on the housing and on the optical combiner are arranged in such a manner, that the first arm and the second arm are positioned in a non-parallel form. The optical combiner is arranged to rotate around the housing between a deployed position and a stowed position.

When the optical combiner is in the deployed position, a user operates the first release mechanism to release the optical combiner, and moves the optical combiner toward the stowed position. As the combiner rotates around the housing, the mean distance between the combiner and the housing varies. The second release mechanism locks the combiner in the stowed position.

Once the optical combiner is in the stowed position, the user operates the second release mechanism to release the optical combiner. The combiner then falls under gravity and rotates around the housing until it reaches the deployed position. The first release mechanism locks the combiner in the deployed position. When moved from the stowed position to the deployed position, the combiner traverses a path similar to the one followed when moving from the deployed position to the stowed position.

While the optical combiner is in the deployed position and the user moves forward and impacts the combiner, the combiner rotates further about the pivot point connecting the housing and the first arm. When the combiner reaches a forward position, it is stopped by a detent arrangement. The user returns the combiner to the original deployed position, by releasing the detent.

U.S. Pat. No. 6,618,203 B2 issued to Nakamura et al., and entitled "Device for Supporting Combiner for Use in Vehicle Display System", is directed to a supporting device for an optical combiner in a head-up display system, attached to the ceiling of a passenger room of a vehicle. The supporting device includes a base member, a first arm, a second arm, a third arm and an optical combiner.

The base member is directly attached to the ceiling of the passenger room of the vehicle. One end of the first arm is pivoted to the base member at a first point. One end of the second arm is pivoted to the base member at a second point, separate from the first point. The other end of the first arm is pivoted to one end of the third arm. The other end of the second arm is pivoted to the other end of the third arm. The optical combiner is fixedly attached to the first arm, such that it is parallel to the first arm. The distance between the two pivot points on the base member, is equal to the distance between the two pivot points of the third arm.

The supporting device is used for moving the optical combiner between a folded state, where the HUD is not used, and a developed state, where the HUD is used. When the optical combiner is in the developed state, the first arm forms an oblique angle with the base member, such that the optical combiner is in the line of sight of the vehicle driver. The second arm and the third arm are developed in such a manner, that they form a common straight line, coupling the other end of the first arm and the second pivot point on the base member.

When the driver moves the combiner to the folded state, the second arm and the third arm are folded against each other by the pivot point connecting them, and are lifted to a position parallel to the base member. The first arm is also lifted up to a position, where it is parallel to the base member. Since the combiner is fixedly connected to the first arm, it is also lifted up to a position parallel to the base member, and out of the view of the driver.

U.S. Pat. No. 6,078,428 issued to Rambert et al., and entitled "Fastening of a Support for On-Board Equipment", is directed to a device for fastening a support of a head-up collimator in an aircraft, to the inner body of the aircraft. The support attaches to the aircraft by a plurality of bolts and screws. The device includes a centering block and a centering pawl, one of which is connected to the aircraft, and the other is connected to the support. The centering block includes a positioning aperture therein, in which the centering pawl is housed. The centering block includes a cup. The pawl is inserted into the cup, in the desirable orientation, and the cup is filled with resin. The resin (which is a non-shrinkable rigid bonder, such as an epoxy bonder) then solidifies around the pawl, forming a positioning cavity in the shape and orientation of the centering pawl.

The end of the centering pawl, which comes in contact with the bonding resin, undergoes adhesive-proof surface treatment, such that the resin does not bond to the pawl. The centering pawl is thus removable from the resin-filled cup, leaving a positioning aperture in the resin. Once the pawl is removed from the cup, the support can be dismounted from the aircraft, by releasing the bolts and screws. After dismounting, the support can be mounted again on the aircraft by placing the centering pawl in the positioning aperture of the resin, and tightening the fastening bolts and screws. The orientation of the support is thus maintained as the orientation before dismounting.

SUMMARY OF THE PRESENT DISCLOSED TECHNIQUE

It is an object of the disclosed technique to provide a novel head up display calibration assembly and a novel head up display combiner deployment mechanism.

In accordance with the disclosed technique, there is thus provided a head up display (HUD) calibration assembly, for coupling a HUD system with the inner walls of a vehicle and adjusting the orientation of the HUD system. The HUD calibration assembly includes a mounting tray, to be coupled with a HUD projector and with a HUD combiner deployment mechanism. The mounting tray includes a plurality of adjustment interface planes, each of which includes a locking screw opening, and a plurality of adjustment assemblies, each coupled with the vehicle in a respective separate anchoring location.

Each of the adjustment assemblies are to be coupled with a respective one of the adjustment interface planes. Each of the adjustment assemblies includes a hollow screw, having a screw socket for adjusting the distance between the respective one of the adjustment interface planes and the vehicle, thereby adjusting the position and orientation of the mounting tray with respect to the vehicle. The hollow screw further has an outer threading portion, and a substantially spherical head. Each of the adjustment assemblies further includes a spherical washer, having an outer surface being topographically compatible with the respective one of the adjustment interface planes, for attaching to the respective one of the adjustment interface planes, and an inner receiving surface being topographically compatible with the shape of the spherical head, for enclosing the spherical head. Each of the adjustment assemblies also includes a locking screw, to be inserted through the respective one of the locking screw openings, through the hollow screw, and threaded into a respective locking screw thread. The locking screw thread is coupled with the vehicle.

Wherein the locking screws are threaded into the respective locking screw thread, after all of the hollow screws are positioned in the desired position, thereby locking the mounting tray at the adjusted position and orientation.

In accordance with the disclosed technique, there is thus further provided a head up display (HUD) combiner deployment mechanism, coupled with a ceiling of a vehicle, the vehicle having a front canopy. The HUD combiner deployment mechanism includes an optical combiner and a four arm assembly. The four arm assembly is movable between a stowed configuration, an intermediate configuration, a deployed configuration and an emergency configuration. The four arm assembly includes a first arm, a second arm, a third arm and a fourth arm. The second arm is coupled with the first arm. The third arm is coupled with the second arm. The first arm is firmly coupled with the ceiling during a transition between the stowed configuration and the intermediate configuration. The third arm is firmly coupled with the optical combiner. The fourth arm is coupled with the third arm and the first arm. The optical combiner further extends from the third arm, which is substantially parallel to the ceiling in the stowed configuration and the intermediate configuration. The third arm is substantially perpendicular to the ceiling in the deployed configuration, thereby locating the optical combiner in the field of view (FOV) of a vehicle operator. The optical combiner reflects information projected thereon and transmits an outside scene to the eyes of the vehicle operator. The third arm is substantially parallel to the front canopy in the emergency configuration. The fourth arm is firmly coupled with the ceiling during a transition between the intermediate configuration and the deployed configuration, and during a transition between the deployed configuration and the emergency configuration.

BRIEF DESCRIPTION OF THE DRAWINGS

The disclosed technique will be understood and appreciated more fully from the following detailed description taken in conjunction with the drawings in which:

FIG. 2A is a schematic illustration of a HUD, in which the optical combiner is in a deployed configuration, constructed and operative in accordance with another embodiment of the disclosed technique;

FIG. 2B is a schematic illustration of the HUD of FIG. 2A, wherein the optical combiner is in an emergency configuration;

FIG. 3A is a schematic illustration of a four-arm mechanism of the HUD of FIG. 2A;

FIG. 3B is a schematic illustration of a four-arm mechanism of the HUD of FIG. 2B;

DETAILED DESCRIPTION OF THE EMBODIMENTS

The disclosed technique overcomes the disadvantages of the prior art by providing a head-up-display (HUD) combiner deployment mechanism, utilizing a two-stage four-arm mechanism, which moves from a stowed configuration to a deployed configuration, through an intermediate configuration using kinematical inversion (i.e., during the transition between the stowed and the intermediate configurations, a certain arm of the four-arm mechanism is fixed and during the transition between the intermediate and the deployed configurations, another arm of the four-arm mechanism is fixed).

The disclosed technique further provides a novel HUD calibration assembly, for mounting tray for coupling a HUD system with the inner walls of a vehicle and adjusting the orientation of the HUD system, by employing a mounting tray and a plurality of adjustment assemblies for precise adjustment of the orientation of the HUD.

The term "vehicle" herein below, refers to ground vehicle (e.g., automobile, cargo vehicle, bus, tank, rail vehicle, armored vehicle, snowmobile), aircraft (e.g., airplane, rotorcraft, amphibian), marine vehicle (e.g., cargo vessel, resort ship, aircraft carrier, battle ship, submarine, motor boat, sailing boat), spaceship, spacecraft, and the like. The term "window" herein below refers to a windshield in of a ground vehicle, canopy in of an aircraft, observation window in of a submarine, and the like.

Figure 1A:
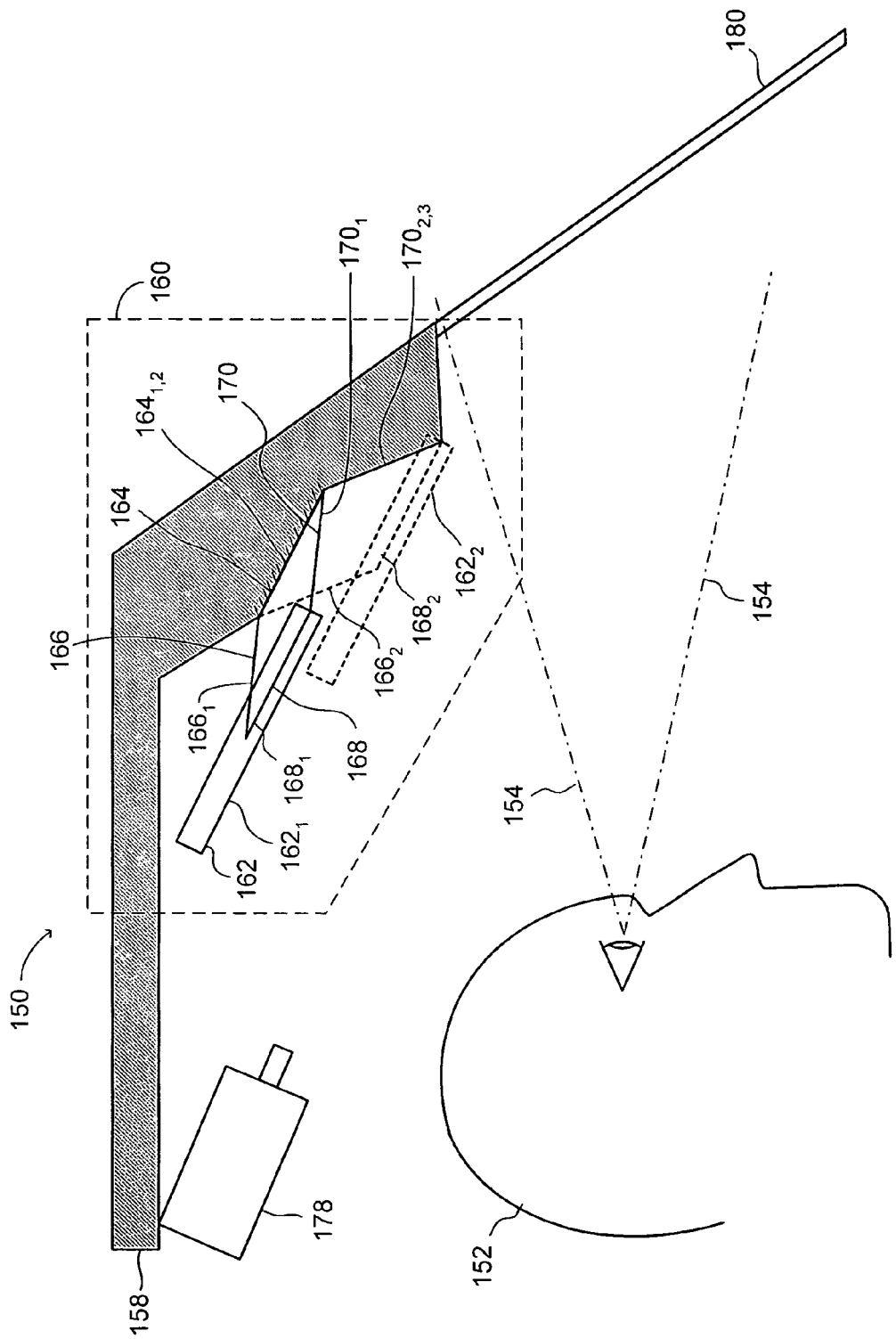
FIG. 1A is a schematic illustration of a HUD, in which an optical combiner of the HUD is in a stowed configuration, the HUD being constructed and operative in accordance with an embodiment of the disclosed technique.
Figure 1B:
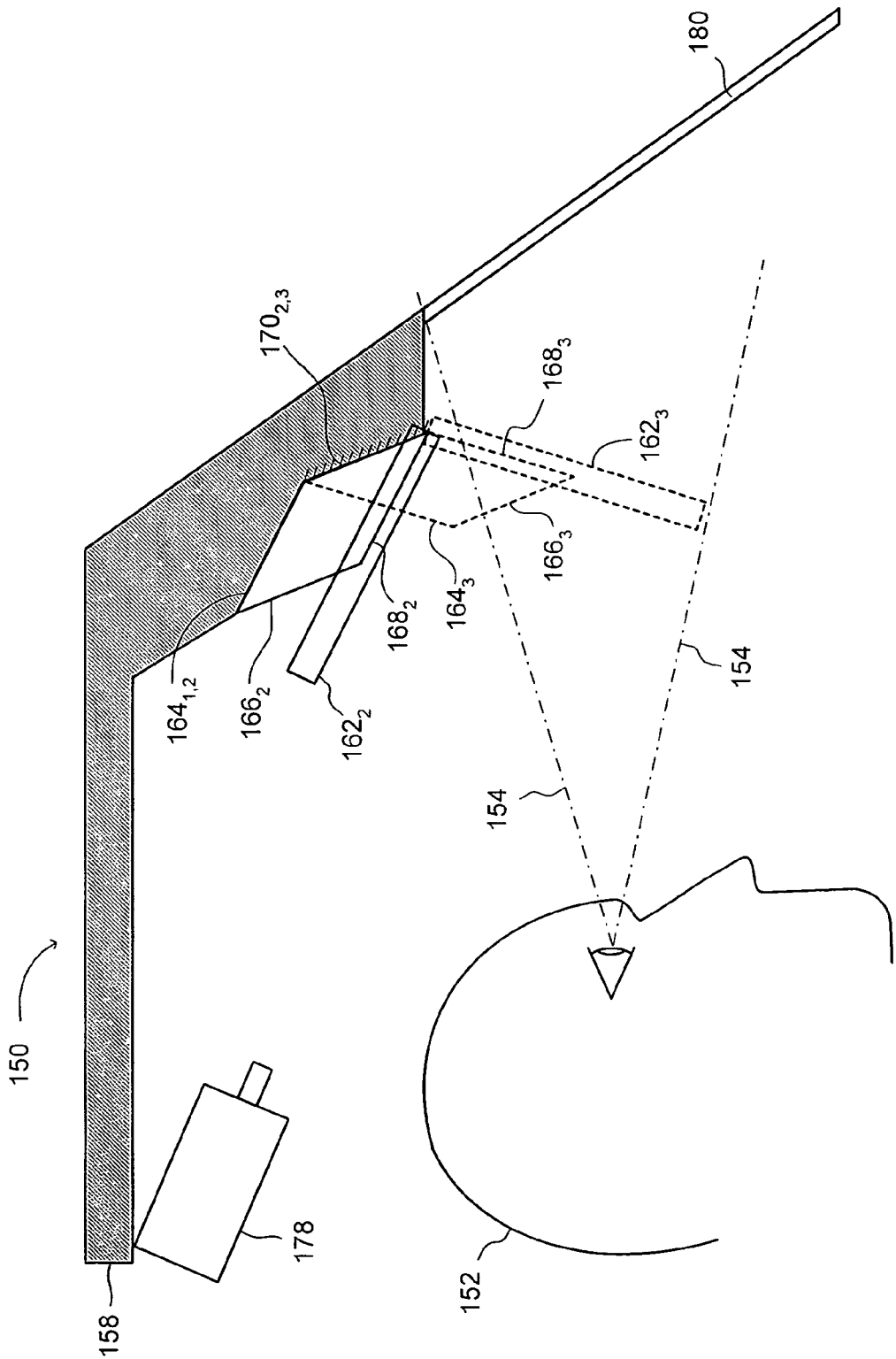
FIG. 1B is a schematic illustration of the HUD of FIG. 1A, wherein the optical combiner is in a deployed configuration.

Reference is now made to FIGS. 1A and 1B. FIG. 1A is a schematic illustration of a HUD, generally referenced 150, in which an optical combiner of the HUD is in a stowed configuration, the HUD being constructed and operative in accordance with an embodiment of the disclosed technique. FIG. 1B is a schematic illustration of the HUD of FIG. 1A, wherein the optical combiner is in a deployed configuration.

With reference to FIG. 1A, HUD 150 includes a projector 178 and a four-arm mechanism 160. Four-arm mechanism 160 includes a first arm 164, a second arm 166, a third arm 168, a fourth arm 170 and an optical combiner 162. One end of first arm 164 is pivotally connected to one end of second arm 166. The other end of first arm 164 is pivotally connected to one end of fourth arm 170. The other end of fourth arm 170 is pivotally connected to one end of third arm 168. The other end of third arm 168 is pivotally connected to the other end of second arm 166. Optical combiner 162 is firmly attached to third arm 168.

HUD 150 is mounted inside a vehicle (not shown). Projector 178 is coupled with a ceiling 158 of the vehicle. Four-arm mechanism 160 is coupled with ceiling 158, at a different point than projector 178. A vehicle window 180 is located in front of a vehicle operator 152, who sits insides the vehicle.

A stowed configuration of four-arm mechanism 160 is depicted in solid lines, and an intermediate configuration of four-arm mechanism 160 is depicted in dotted lines. When four-arm mechanism 160 is in the stowed configuration, optical combiner 162 is out of a field of view 154 of vehicle operator 152. In the stowed configuration, projector 178 is disabled and provides no information to optical combiner 162. The disclosed technique can be especially employed in HUD on board an aircraft, for providing a pilot with flight related information.

During the transition between the stowed configuration and the intermediate configuration, first arm 164 is fixed in position $164_{1,2}$. Second arm 166 moves from a first position 166, to a second position $166_2$. Third arm 168 moves from a first position 168, to a second position $168_2$. Fourth arm 170 moves from a first position 170, to a second position $170_{2,3}$. Optical combiner 162 moves from a first position $162_1$ to a second position $162_2$.

When four-arm mechanism 160 reaches the intermediate configuration, kinematical inversion takes place. First arm 164 is released, and is allowed to move, while fourth arm 170 is fixed at position $170_{2,3}$. The releasing of one arm and the fixing of another arm of four-arm mechanism 160 is performed by methods known in the art, such as by employing a mechanical element, an electromechanical element, and the like.

With reference to FIG. 1B, an intermediate configuration of four-arm mechanism 160 is depicted in solid lines, and a deployed configuration of four-arm mechanism 160 is depicted in dotted lines. During the transition between the intermediate configuration and the deployed configuration, fourth arm 170 is fixed in position $170_{2,3}$. First arm 164 moves from second position $164_{1,2}$ to a third position $164_3$. Second arm 166 moves from second position $166_2$ to a third position $166_3$. Third arm 168 moves from second position $168_2$ to a third position $168_3$. Optical combiner 162 moves from second position $162_2$ to a third position $162_3$.

When four-arm mechanism 160 is in the deployed configuration, optical combiner 162 is in field of view 154 of vehicle operator 152. Projector 178 is enabled to project information onto optical combiner 162, which is then in position $162_3$. Vehicle operator 152 observes the visual vehicle related information reflected from optical combiner 162 along with an image of the scene.

According to another aspect of the disclosed technique, a HUD four-arm mechanism moves from a deployed configuration to a further configuration, in case of sudden deceleration of the vehicle (e.g., in case of crash in a ground vehicle, emergency). When the four-arm mechanism moves to the further configuration, it prevents head injury to the vehicle operator, by preventing the head from impacting with the optical combiner of the HUD four-arm mechanism.

Reference is now made to FIGS. 2A, 2B, 3A and 3B. FIG. 2A is a schematic illustration of a HUD, generally referenced 250, in which the optical combiner is in a deployed configuration, constructed and operative in accordance with another embodiment of the disclosed technique. FIG. 2B is a schematic illustration of the HUD of FIG. 2A, wherein the optical combiner is in an emergency configuration. FIG. 3A is a schematic illustration of the four-arm mechanism of the HUD of FIG. 2A. FIG. 3B is a schematic illustration of the four-arm mechanism of FIG. 2B.

With reference to FIG. 2A, HUD 250 includes a projector (not shown) and a four-arm mechanism 251. Four-arm mechanism 251 includes a first arm 260, a second arm 262, a third arm 264, a fourth arm 266 and an optical combiner 268. One end of first arm 260 is pivotally connected to one end of second arm 262. The other end of first arm 260 is pivotally connected to one end of fourth arm 266. The other end of fourth arm 266 is pivotally connected to one end of third arm 264. The other end of third arm 264 is pivotally connected to the other end of second arm 262. Optical combiner 268 is firmly attached to third arm 264.

HUD 250 is mounted inside a vehicle (not shown). The projector is coupled with a ceiling 258 of the vehicle. Four-arm mechanism 251 is coupled with ceiling 258, at a different point than the projector. Window 270 is located in front of a head 252 of the vehicle operator.

When four-arm mechanism 251 is in the deployed configuration, vehicle related information is projected from the projector onto optical combiner 268, which is located within a field of view 254 of the vehicle operator. The vehicle operator observes the vehicle related information reflected from optical combiner 268 along with an image of a scene (not shown) located in front of the vehicle.

With reference to FIG. 3A, four-arm mechanism 251 is in the deployed configuration. Four-arm mechanism 251 further includes a spring element 280, a lever 282, a cam 286 and a cam follower 288. Cam 286 is pivotally coupled with one end of first arm 260 (i.e., cam 286 is also coupled with the other end of fourth arm 266), at a pivot 290. One end of lever 282 is coupled with cam follower 288. The other end of lever 282 is coupled with spring 280. Lever 282 is pivotally coupled with first arm 260 at a point 284, which is distant from both ends of lever 282, and also distant from both ends of first arm 260. Spring 280 is further coupled with the other end of first arm 260. Cam follower 288 is adjacent to a first side of cam 286, thereby maintaining lever 282 and spring 280 in their position.

With reference to FIG. 2B, in a state of emergency, the vehicle is advancing forward, and suddenly decelerates. Such emergency states are, for example, a rough landing of an aircraft, a rapid braking of a car, or an impact with another vehicle. When the vehicle moves forward, and suddenly decelerates, head 252 of the vehicle operator naturally moves forward, due to the inertia thereof, along a path 272, to an emergency position $252_E$.

Head 252, in the emergency position $252_E$, would impact with optical combiner 268, if optical combiner 268 were to stay at the deployed position, depicted in dotted lines. For preventing such impact, four-arm mechanism 251 moves from the deployed configuration, to emergency configuration $250_E$. Since third arm 264 is pivotally connected to fourth arm 266, in case of emergency, third arm 264 and optical combiner 268 move forward (i.e., toward the canopy), due to the inertia thereof.

With reference to FIG. 3B, four-arm mechanism 251 of FIG. 2B is depicted in the emergency configuration. Due to the forward movement of third arm 264 and optical combiner 268, spring 280 is stretched. When spring 280 is stretched, is acquires a potential energy, which is proportional to the amount of stretch. Once spring 280 is stretched a predetermined amount (i.e., spring 280 acquires a predetermined potential energy), spring 280 pulls cam follower 288. Cam follower 288 rolls forward on cam 286, until cam follower 288 passes the tip of cam 286, and is adjacent to a second side of cam 286. Thus, four-arm mechanism 251 moves to emergency configuration $251_E$, wherein optical combiner 268 is an emergency position $268_E$, cam 286 is in an emergency position $286_E$, cam follower 288 is in an emergency position $288_E$, spring 280 is in an emergency position $280_E$, and lever 282 is in an emergency position $282_E$.

The condition for the further stretch of spring 280 may also be considered to be the amount of backward acceleration (i.e., deceleration) of the vehicle, and of fourth arm 266, when it is in the deployed configuration. When the backward acceleration of the vehicle, is greater than a predetermined value (e.g., 4g, wherein g is the gravitational acceleration at the surface of the earth), spring 280 is stretched a further amount, moving four-arm mechanism 251 to the emergency configuration $251_E$, wherein optical combiner 268 is an emergency position $268_E$.

It is noted that four-arm mechanism 251 may include alternative elements for the purpose of moving four-arm mechanism 251 to the emergency configuration, such as an acceleration sensor, an electromechanical element, and the like. Such elements are capable of sensing the acceleration of the object they are mounted on, in a similar manner to when spring element 280 stretches in response to the acceleration of the vehicle. If an electromechanical element is used, a switch can measure the amount of movement of the optical combiner in case of an emergency. The switch can be, for example, an electrical switch or a mechanical switch. When the optical combiner moves a predetermined amount forward (i.e., along the direction of movement of the vehicle), from the deployed configuration, a mechanical arm or lever, coupled with the four-arm mechanism, can be set to move the optical combiner further forward. In this manner, the electromechanical element moves the four-arm mechanism to the emergency configuration.

During the transition to the emergency configuration, fourth arm 266 is fixed. First arm 260 moves to an emergency position $260_E$. Second arm 262 moves to an emergency position $262_E$. Third arm 264 moves to an emergency position $264_E$. Optical combiner 268 moves to emergency position $268_E$. With further reference to FIG. 2B, when moving along path 272, head 252 moves in a safe position away from optical combiner 268, which is in emergency position $268_E$. Thus head 252 is kept safe from injury by hitting optical combiner 268, in case of emergency.

Figure 5:
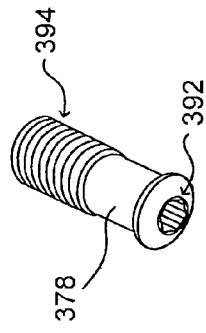
FIG. 5 is a perspective schematic illustration of a hollow screw of FIG. 4, according to the disclosed technique.
Figure 4:
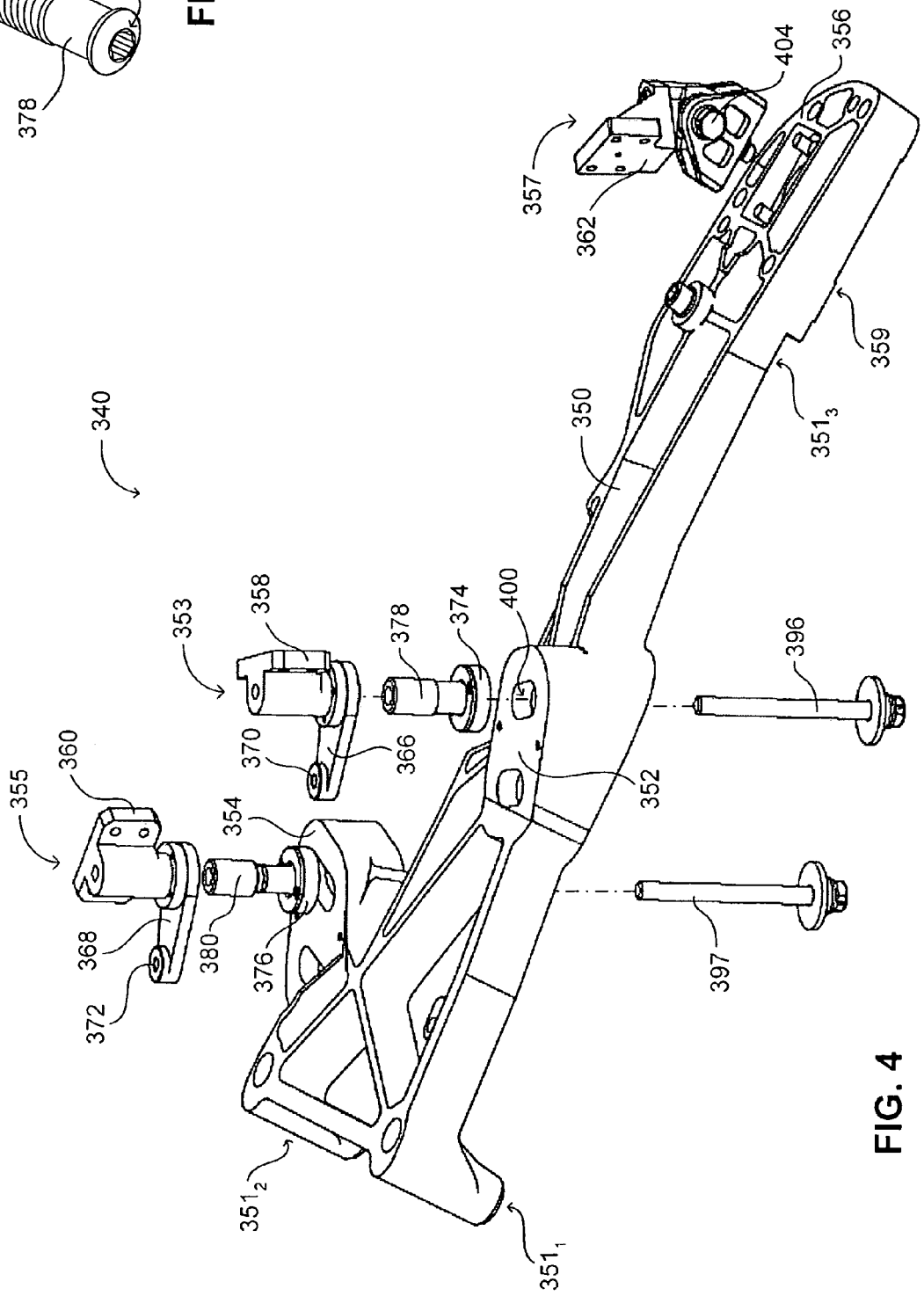
FIG. 4 is an exploded elevated view of a HUD calibration assembly, constructed and operative in accordance with a further embodiment of the disclosed technique.

Reference is now made to FIGS. 4 and 5. FIG. 4 is an exploded elevated view of a HUD calibration assembly, generally referenced 340, constructed and operative in accordance with a further embodiment of the disclosed technique. FIG. 5 is a perspective schematic illustration of a hollow screw of FIG. 4, according to the disclosed technique. HUD calibration assembly 340 includes a first adjustment assembly 353, a second adjustment assembly 355, a pivot assembly 357 and a HUD mounting tray 350. HUD mounting tray 350 includes a first adjustment interface plane 352, a second adjustment interface plane 354, a tray pivot interface 356, a plurality of projector interfaces $351_1$, $351_2$ and $351_3$, and a combiner interface 359.

HUD calibration assembly 340 fastens a HUD projector and a HUD combiner mechanism to the inner body (not shown) of a vehicle (e.g., to the ceiling or to the support beams of the vehicle). First adjustment assembly 353, second adjustment assembly 355 and pivot assembly 357 are coupled with the inner walls of the vehicle, and are employed to adjust the position and orientation of mounting tray 350. Adjusting the orientation of the mounting tray determines the orientation of the HUD projector and a HUD combiner mechanism, such that projected images are aligned with the outside view of the vehicle operator (i.e., calibration of the projector).

First adjustment assembly 353 includes a first flange 358, a first gripping arm 366, a first hollow screw 378, a first captive spherical washer 374 and a first locking screw 396. Similarly, second adjustment assembly 355 includes a second flange 360, a second gripping arm 368, a second hollow screw 380, a second captive spherical washer 376 and a second first locking screw 397. Pivot assembly 357 includes a third flange 362 and a radial spherical plane bearing 404.

A person calibrating the HUD in the vehicle (e.g., a calibration technician) attaches first flange 358, second flange 360 and third flange 362, to the vehicle ceiling, each at a first end thereof, for example with fastening screws (not shown). First flange 358 is coupled with the vehicle ceiling at a first anchoring location, second flange 360 at a second anchoring location and third flange 362 at a third anchoring location, each anchoring location being separate from the others. First flange 358 is coupled, at the other end thereof, with a first end of first gripping arm 366. First gripping arm 366 includes a first temporary suspension screw thread 370 on the other end thereof. Second flange 360 is coupled on its other end, with a second gripping arm 368. Second gripping arm 368 includes a second temporary suspension screw thread 372 on the other end thereof.

After coupling first, second and third flanges 358, 360 and 362 to the vehicle ceiling, the calibration technician couples the other end of first flange 358 with a first hollow screw 378 and first captive spherical washer 374. The head of first hollow screw 378 is of a substantially spherical shape, and is enclosed by a first captive spherical washer 374. The calibration technician also couples the other end of second flange 360 with a second hollow screw 380 and second captive spherical washer 376. The head of second hollow screw 380 is of a substantially spherical shape, and is enclosed by a second captive spherical washer 376. The calibration technician further couples the other end of third flange 362 with radial spherical plane bearing 404.

With reference to FIG. 5, first hollow screw 378 includes an inner hollow portion, surrounded by an outer portion, such that a suitable locking screw may be passed through the hollow portion. The outer portion of the hollow screw includes a threading area 394. The head of first hollow screw 378 includes a hollow screw socket 392, by which the position and orientation of hollow screw 378 may be adjusted. It is noted, that while FIG. 5 refers to first hollow screw 378, the above description similarly relates to second hollow screw 380, which is identical to first hollow screw 378.

Figure 6C:
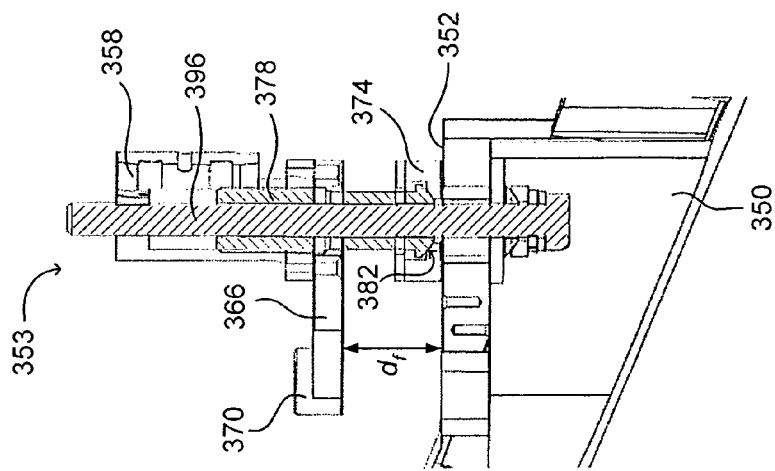
FIG. 6C is a sectional side view of the first adjustment assembly of the HUD mounting tray of FIG. 4, wherein the temporary suspension screw is removed from the adjustment assembly.
Figure 6B:
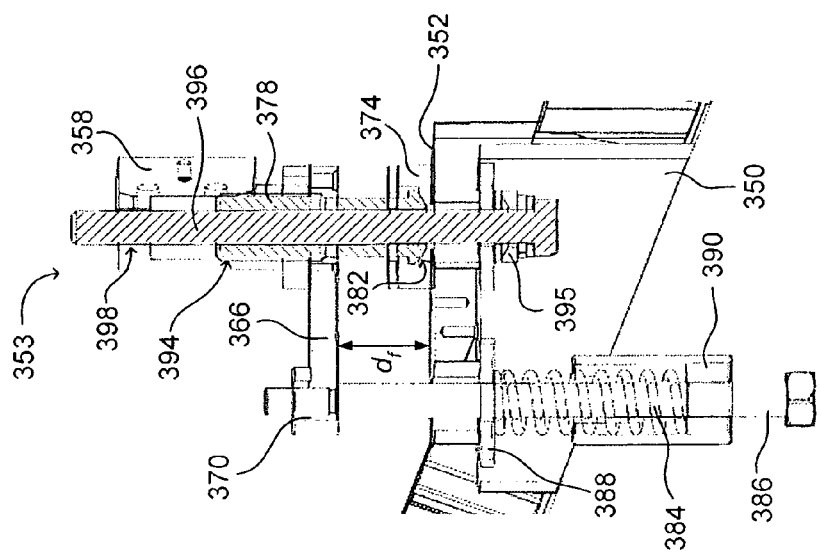
FIG. 6B is a sectional side view of the first adjustment assembly of the HUD mounting tray of FIG. 4, wherein a locking screw is inserted to the adjustment assembly.
Figure 6A:
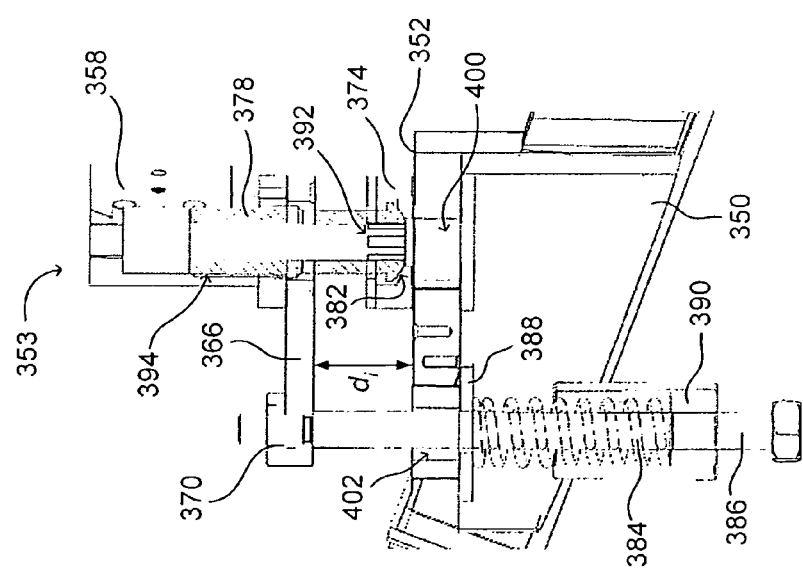
FIG. 6A is a sectional side view of the first adjustment assembly of the HUD mounting tray of FIG. 4, wherein a temporary suspension screw is inserted to the adjustment assembly.

Reference is now made to FIGS. 6A, 6B and 6C. FIG. 6A is a sectional side view of the first adjustment assembly of FIG. 4, wherein a temporary suspension screw is inserted to the HUD mounting tray. FIG. 6B is a sectional side view of the first adjustment assembly of FIG. 4, wherein a locking screw is inserted to the adjustment assembly. FIG. 6C is a sectional side view of the first adjustment assembly of FIG. 4, wherein the temporary suspension screw is removed from the adjustment assembly. First adjustment interface plane 352 includes therein a locking screw opening 400 and a temporary suspension screw opening 402, for receiving first adjustment assembly 353 therein.

The calibration technician attaches HUD mounting tray 350 to the adjustment assemblies. First, the technician connects mounting tray 350 to third flange 362, through pivot interface 356, for example, with screws (not shown). Radial spherical plane bearing 404 allows a pivotal motion of HUD mounting tray 350 relative to third flange 362, in all three axes. The technician then positions HUD mounting tray 350 with respect to the vehicle ceiling, such that first adjustment interface plane 352 is placed adjacent to first adjustment assembly 353, and second adjustment interface plane 354 is placed adjacent to second adjustment assembly 353.

Temporary suspension screw 386 is encircled by a suspension spring 384, which is enclosed within a nut 390. Temporary suspension screw 386 and suspension spring 384 thus constitute a suspension assembly. Suspension spring 384 is coupled between mounting tray 350 and the head of suspension screw 386. The technician inserts temporary suspension screw 386 through temporary suspension screw opening 402 of first adjustment interface plane 352. The technician then threads temporary suspension screw 386 into first temporary suspension screw thread 370 of first gripping arm 366, while compressing on suspension spring 384, until the adjustment interface plane 352 is forcibly attached to the lower outer surface of first captive spherical washer 374. The lower outer surface of first captive spherical washer 374 is topographically compatible with adjustment interface plane 352. The initial distance between the adjustment interface plane 352 and first gripping arm 366 is thus set to be $d_i$. Suspension spring 384 is coupled with a stopping ring 388, at the one end thereof. Since stopping ring 388 is wider than temporary screw opening 402, it prevents spring 384 from passing through temporary suspension screw opening 402. Since suspension spring 384 is compressed, it applies upward pressure, thereby seeking to maintain HUD mounting tray 350 and captive spherical washer 374 pressed together. In other words, suspension spring 384 applies a separating force between mounting tray 350 and the head of temporary suspension screw 386. Temporary suspension screw 386 also eliminates other gaps, which may be created between adjustment interface plane 352 and adjustment assembly 353.

The technician similarly fastens second adjustment interface plane 354 to adjustment assembly 355, by screwing a second temporary suspension screw (not shown) into second temporary suspension screw thread 372. Thus, suspension spring 384 and the suspension spring of second temporary suspension screw press upward on HUD mounting tray 350, such that the tray is fastened against adjustment assemblies 353 and 355 during the adjustment of a calibration imaging device (e.g., a calibration telescope, not shown).

The technician installs the calibration telescope on HUD mounting tray 350, and adjusts the orientation thereof, according to a target image (not shown), placed in front of the calibration telescope. The technician can adjust the orientation of the calibration telescope by changing the distance between HUD mounting tray 350 and each of gripping arms 366 and 368. The technician adjusts the distance between HUD mounting tray 350 and gripping arm 366, by rotating hollow screw socket 392. As the outer portion of first hollow screw 378 includes threading area 394, the rotation threads first hollow screw 378 into (or out of) first flange 358, thereby changing the initial distance $d_i$ to a final distance $d_f$. First hollow screw 378 may either apply upward or downward pressure on HUD mounting tray 350 (depending on the direction of rotation), thereby either seeking to reduce or to enlarge the initial distance $d_i$. First captive spherical washer 374 surrounds the spherical head of hollow screw 378, within a receiving surface 382 thereof. Receiving surface 382 is of a spherical shape, such that it allows relative movement of adjustment interface plane 352 (and washer 374) relative to the head of hollow screw 378, in three axes, until reaching the desired final distance $d_f$, and thus the desired orientation of the calibration telescope.

Alternatively, the hollow screw and the captive spherical washer may be positioned upside-down, relative to the mounting tray, such that the hollow screw is threaded into the mounting tray, instead of into the flange. In such a case, the outer surface of the captive spherical washer is topographically compatible with the surface of the flange or of the vehicle ceiling.

The technician similarly adjusts the distance between adjustment interface plane 354 and second gripping arm 368 of second adjustment assembly 355. Since tray pivot interface 356 is coupled to third flange 362 through radial spherical plane bearing 404, it allows independent pivotal motion of each of hollow screws 378 and 380, in all three axes. This allows adjustment of the distance between HUD mounting tray 350 and each of gripping arms 366 and 368, independently. In other words, this allows the calibration of pitch and roll movement of HUD mounting tray 350. Locking screw opening 400 may be an elongated opening, extending laterally on first adjustment interface plane 352. Similarly, the second locking screw opening of second adjustment interface plane 354 extends laterally in the same direction as locking screw opening 400. The technician may achieve calibration of yaw movement, by moving mounting tray 350 in the lateral direction, along the longitudinal axis of locking screw opening 400 and the second locking screw opening. Such movement serves as movement of the mounting tray along a yaw plane, thereby allowing yaw calibration as well.

With reference to FIG. 6B, once first hollow screw 378 is positioned such that the desired distance $d_f$ is achieved, the technician inserts first locking screw 396 through locking screw opening 400, and through the hollow portion of first hollow screw 378. First locking screw 396 is an elongated screw, of such a diameter fitting inside the hollow portion of first hollow screw 378. The technician then threads first locking screw 396 into a respective threading area 398, within first flange 358. It is noted, that locking screw opening 400 is large enough relative to the diameter of first locking screw 396, in order to allow angular freedom between first locking screw 396 and mounting tray 350, and between first locking screw 396 and first hollow screw 378. The head of first locking screw 396 is separated from mounting tray 350 by a spherical disc 395, which further allows angular freedom between first locking screw 396 and mounting tray 350. This makes it possible to thread first locking screw 396 into threading area 398, even when first locking screw 396 is not perpendicular to adjustment interface plane 352.

The technician similarly inserts second locking screw 397 (which is similar to first hollow screw 396 and is depicted in FIG. 4) through the respective locking screw opening, and through second hollow screw 380. The technician then threads second locking screw 397 within a respective threading area (not shown), within second flange 360, after adjusting the respective distance relative to adjustment interface plane 354. Thus, first locking screw 396 and second locking screw 397 lock HUD mounting tray 350, at the desired position and orientation.

With reference to FIG. 6C, the technician removes temporary suspension screw 386 from first adjustment assembly 353, and the second temporary suspension screw from second adjustment assembly 354. HUD mounting tray 350 then maintains its orientation (i.e., it maintains distance $d_f$), since it is locked in place by the locking screws. The technician may then remove the calibration telescope, and install the HUD projector and HUD combiner on HUD mounting tray 350. The technician installs HUD projector to projector interfaces $351_1$, $351_2$, and $351_3$, and HUD combiner to combiner interface 359. The HUD projector and the combiner shall be oriented precisely as the calibration telescope, at the desired orientation relative to the view.

It is noted, that while the above description relates to the calibration of a HUD system within a vehicle, the disclosed calibration assembly may similarly be employed to calibrate any other system. It is further noted, that flanges 358, 360 and 362 may be eliminated from the calibration assembly, in which case hollow screws 378 and 380 may be threaded directly into threading areas (not shown), located in the vehicle ceiling.

Figure 7:
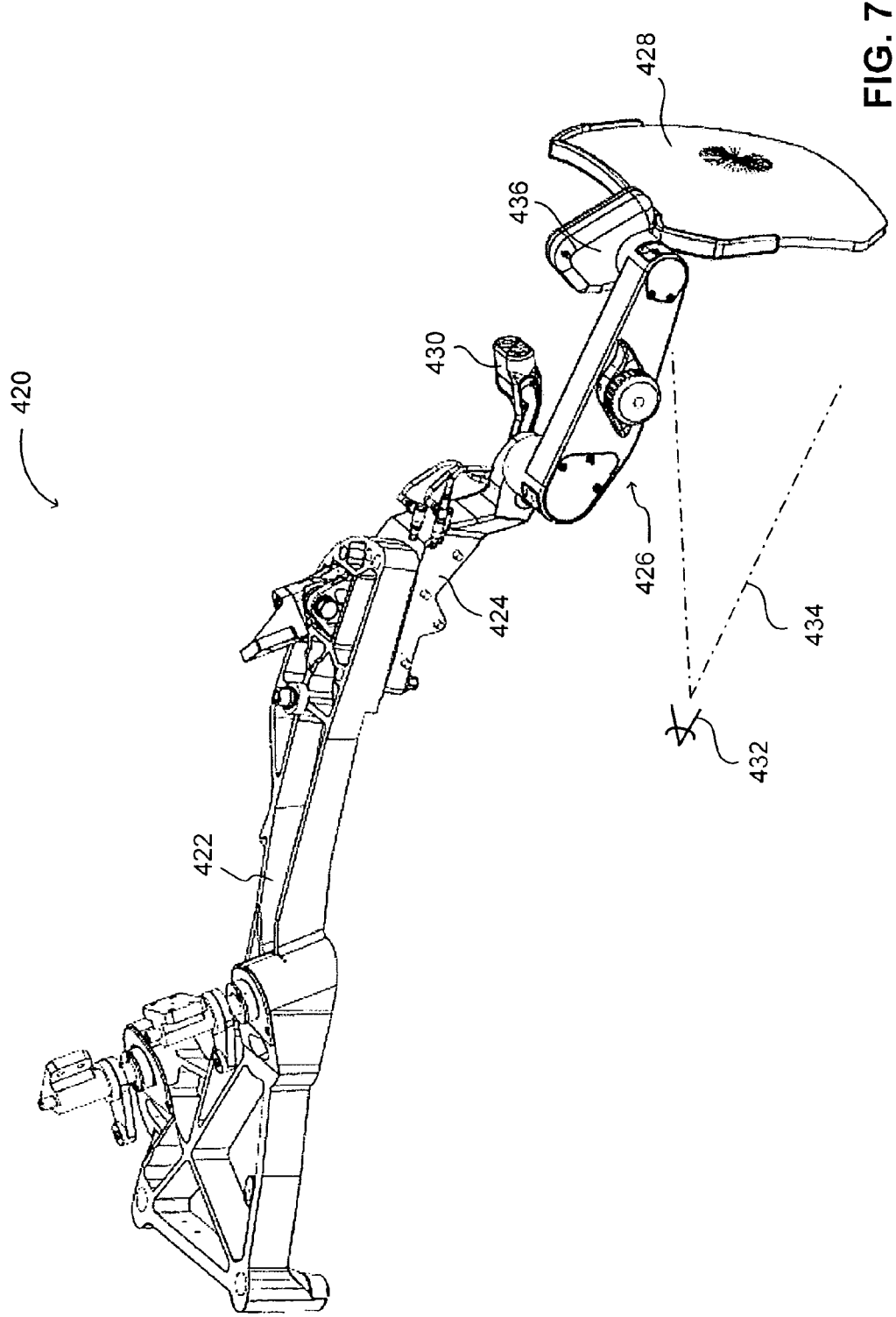
FIG. 7 is an elevated view of a HUD in a deployed configuration, constructed and operative in accordance with another embodiment of the disclosed technique.
Figure 9A:
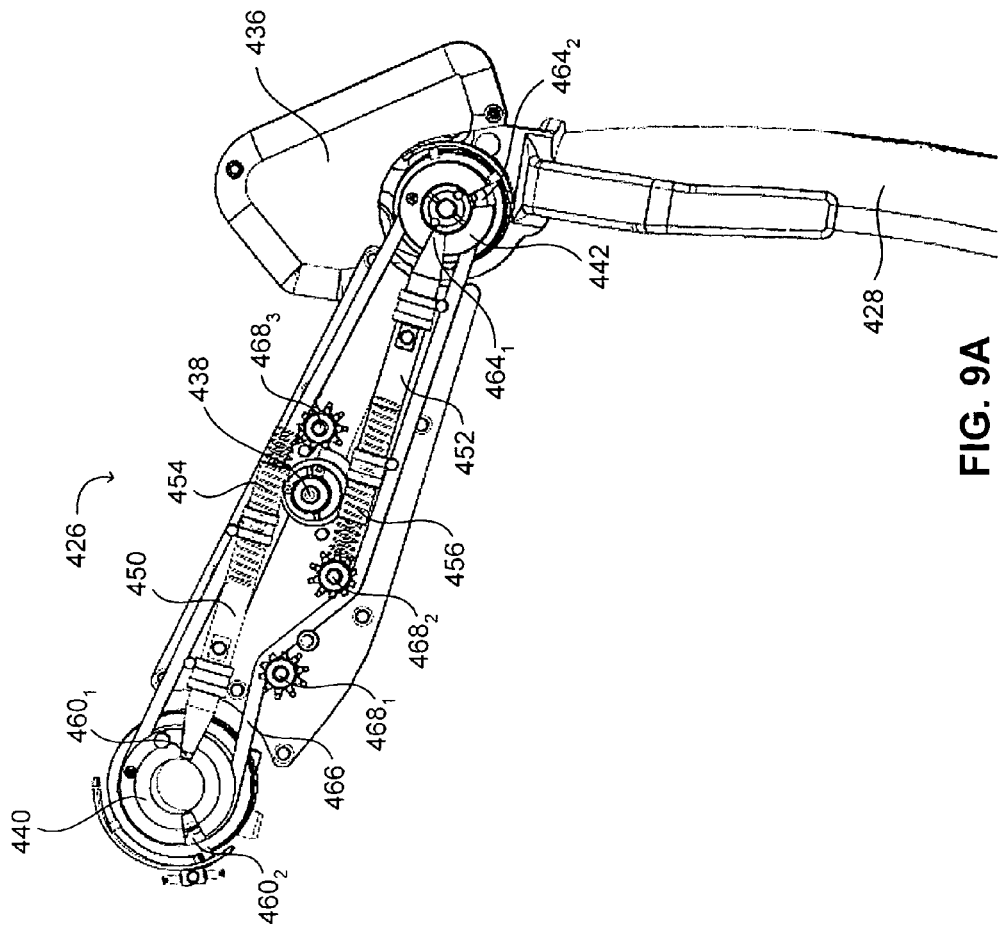
FIG. 9A is a sectional side view of the combiner deployment mechanism of FIG. 8A.
Figure 8A:
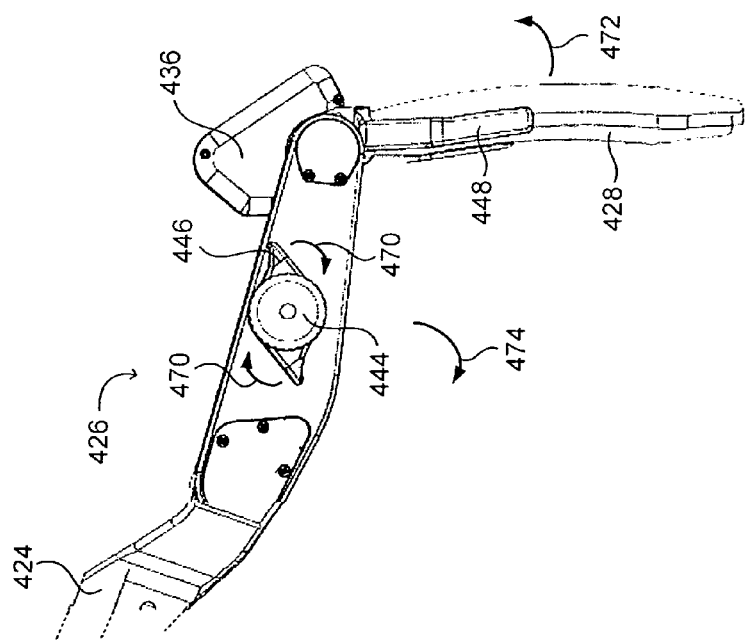
FIG. 8A is a side view of the combiner deployment mechanism of FIG. 7, wherein the combiner is deployed.
Figure 9B:
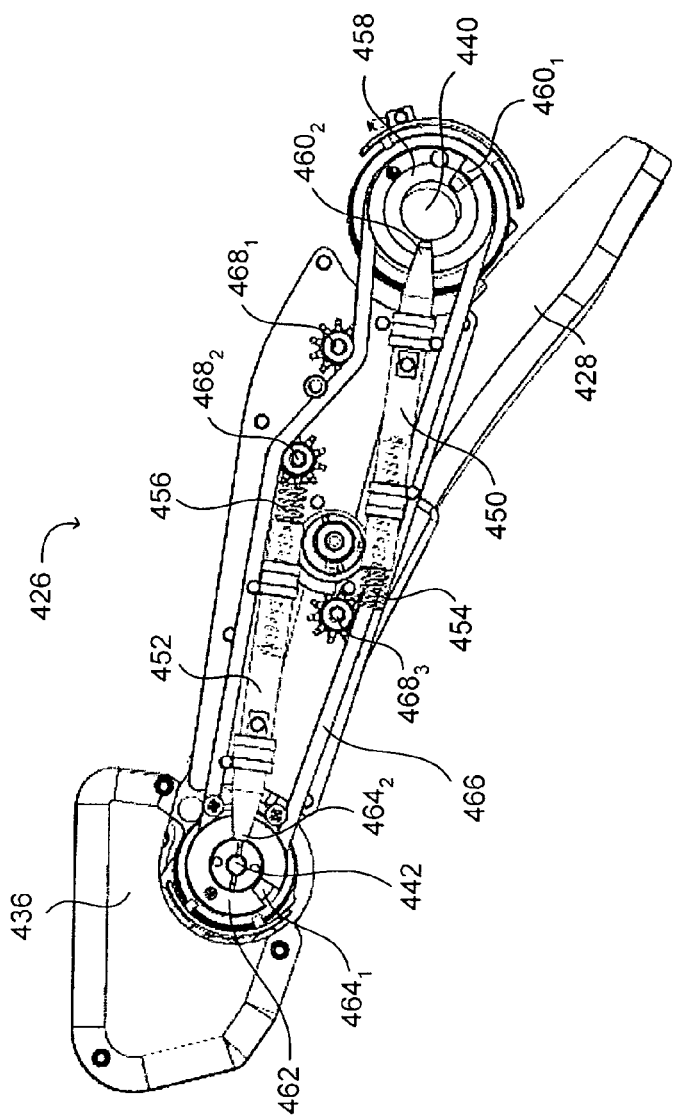
FIG. 9B is a sectional side view of the combiner deployment mechanism of FIG. 8B.
Figure 8B:
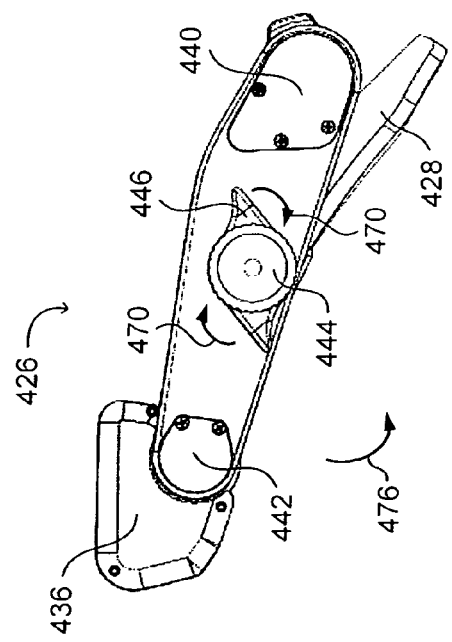
FIG. 8B is a side view of the combiner deployment mechanism of FIG. 7, wherein the combiner is stowed.

Reference is now made to FIGS. 7, 8A, 8B, 9A and 9B. FIG. 7 is an elevated view of a HUD, generally referenced 420, in a deployed configuration, constructed and operative in accordance with another embodiment of the disclosed technique. FIG. 8A is a side view of the combiner deployment mechanism of FIG. 7, wherein the combiner is deployed. FIG. 8B is a side view of the combiner deployment mechanism of FIG. 7, wherein the combiner is stowed. FIG. 9A is a sectional side view of the combiner deployment mechanism of FIG. 8A. FIG. 9B is a sectional side view of the combiner deployment mechanism of FIG. 8B.

HUD 420 includes a HUD mounting tray 422, a static arm 424, a combiner deployment mechanism 426, a combiner 428, an Ambient Light Sensor (ALS) 430 and an emergency mechanism 436. HUD 420 further includes a HUD projector (not shown), coupled with HUD mounting tray 422. One end of static arm 424 is firmly coupled with HUD mounting tray 422, at the combiner interface thereof (similar to combiner interface 359 of FIG. 4). The other end of static arm 424 is pivotally coupled with one end of combiner deployment mechanism 426. The other end of combiner deployment mechanism 426 is pivotally coupled with emergency mechanism 436. Combiner 428 is firmly coupled with emergency mechanism 436, through a combiner frame 448. An eye point 432 indicates the approximate location of an eye point of a vehicle operator (not shown), having a field of view (FOV) 434. When HUD 420 is in the deployed configuration, combiner 428 is located within FOV 434, such that the vehicle operator can observe symbols projected on combiner 428. ALS 430 is coupled with the other end of static arm 424, such that it receives ambient light in the vehicle. HUD mounting tray 422 is similar to HUD mounting tray 350 of FIG. 4. HUD mounting tray 422 is coupled with respective adjustment assemblies, which are coupled with the inner walls (not shown) of the vehicle. ALS 430 may adjust the brightness of the displayed symbols on combiner 428, according to the ambient light in the vehicle.

With reference to FIGS. 8A and 9A, combiner deployment mechanism 426 is a dynamic arm, movable between a deployed position and a stowed position. Combiner deployment mechanism 426 includes a static pivot 440 on the one end thereof, a combiner pivot 442 on the other end thereof, a handle 444 and a release handle 446. Handle 444 is coupled with the outer body of combiner deployment mechanism 426. Combiner deployment mechanism 426 further includes a pair of positioning pins 450 and 452, a pair of loading springs 454 and 456, a sprocket chain 466, a release pivot 438 and a plurality of sprocket wheels 468$_1$, 468$_2$ and 468$_3$. Static pivot 440 is slotted with a static first and second position slot 460$_1$, 460$_2$. Combiner pivot 442 is slotted with a combiner first and second position slot 464$_1$, 464$_2$. Position slots 460$_1$, 460$_2$, 464$_1$ and 464$_2$ may have the general shape of a V-groove.

Release handle 446 is coupled with release pivot 438. Release handle 446 includes a central part and a pair of wedges, extending toward opposite directions of the central part. Handle 444 is placed over the central part of release handle 446. Each of loading springs 454 and 456 are coupled with each of positioning pins 450 and 452, respectively. Each of positioning pins 450 and 452 is of an elongated shape, the one end thereof loaded by each of loading springs 454 and 456, respectively, and coupled with release pivot 438. The other end of positioning pin 450 is tapering, such that it fits into static first position slot 460$_1$. The other end of positioning pin 452 is tapering, such that it fits into combiner first position slot 464$_1$. Sprocket chain 466 fits around sprocket wheels 468$_1$, 468$_2$ and 468$_3$, as well as around a static sprocket wheel (not shown, located behind static pivot 440) and a combiner sprocket wheel (not shown, located behind combiner pivot 442). In this manner, when either of the sprocket wheels is turned, sprocket chain 466 is set to move winding around the sprocket wheels. Sprocket chain 466 may be constructed, for example, from stainless steel, plastic, polycarbonate material, and the like, assuring long shelf life of combiner deployment mechanism 426. Sprocket chain 466 may alternatively be replaced with any other motion transmission element, such as a timing belt, a metal belt, and the like.

Combiner deployment mechanism 426 holds combiner 428 in the deployed configuration, since both positioning pins 450 and 452 are spring loaded into the respective first position slots 460$_1$ and 464$_1$. The vehicle operator wishes to move combiner 428 from the deployed configuration to the stowed configuration (as depicted in FIGS. 8B and 9B). The vehicle operator turns release handle 446 in the direction indicated by arrows 470. As a result, release pivot 438 turns in the same direction, thereby pulling back on each of positioning pins 450 and 452, such that the tapering ends thereof are simultaneously pulled out of the respective first position slots 460$_1$ and 464$_1$. Once positioning pins 450 and 452 are released from the first position slots, the vehicle operator grips handle 444 and moves it in the direction indicated by arrow 474. When handle 444 moves, it induces a circular motion of sprocket chain 466 over the plurality of sprocket wheels. As sprocket chain 466 moves, it turns the combiner sprocket wheel along with combiner pivot 442, and the static pivot 440. As a result, combiner 428 folds over combiner deployment mechanism 426 in the direction indicated by arrow 472. This motion continues until the tapering heads of positioning pins 450 and 452 are located opposite to the respective second position slots 460$_2$ and 464$_2$, simultaneously.

With reference to FIGS. 8B and 9B, spring 454 applies a force onto positioning pin 450, such that the tapering head thereof is fit into static second position slot 460$_2$. Similarly, spring 456 applies a force onto positioning pin 452, such that the tapering head thereof is fit into combiner second position slot 464$_2$. Thus, combiner deployment mechanism 426 holds combiner 428 in the stowed configuration. In the stowed configuration, combiner 428 is located outside of FOV 434 of the vehicle operator, allowing the vehicle operator to observe the external view unobstructed. It is noted, that in the stowed configuration, combiner 428 is also located outside a head clearance distance, thereby preventing contact between the head of the vehicle operator and the combiner.

During the motion between the deployed configuration and the stowed configuration, static pivot 440 pivots around an angular span of approximately 145.5°, and combiner pivot 442 pivots around an angular span of approximately 240°. The angular span of each of static pivot 440 and combiner pivot 442 is determined by the transmission ratio between the combiner pivot and the static pivot. The transmission ratio may be, for example, of 1:1.65.

When positioning pin 450 approaches the respective first or second position slot in static pivot 440, spring 454 applies sufficient pressure on positioning pin 450, such that it fits into the position slot automatically. For example, when positioning pin 450 is distant a certain angular distance (e.g., a 1° angular distance) from static second position slot 460$_2$, spring 454 is constructed to apply sufficient pressure thereon, such that it automatically fits into the position slot. Similarly, spring 456 is constructed to apply sufficient pressure on positioning pin 452, when it is distant a certain angular distance from combiner second position slot 464$_2$, such that it automatically fits into the position slot. In this manner, when the vehicle operator moves combiner deployment mechanism 426 up to a predetermined angular distance from the stowed configuration (or the deployed configuration), the mechanism automatically moves further, into the stowed (or deployed) position.

It is noted, that when the vehicle operator does not move combiner deployment mechanism 426 over the predetermined angular distance from the stowed (or deployed) configuration, the mechanism drops down from static arm 424. In this manner, combiner 428 also drops down from combiner pivot 440, such that it is not usable by the vehicle operator. The vehicle operator is thereby alerted that combiner 428 is out of the stowed configuration as well as out of the deployed configuration. The vehicle operator can then pull (or push) handle 444, in order to move combiner 428 to either of the determined configurations.

When the vehicle operator wishes to move combiner 428 from the stowed configuration to the deployed configuration, he turns release handle 446 in the direction indicated by arrows 470. As a result, release pivot 438 turns in the same direction, thereby pulling back on each of positioning pins 450 and 452, such that the tapering ends thereof are pulled out of the respective second position slots $460_2$ and $464_2$. Once positioning pins 450 and 452 are released from the second position slots, the vehicle operator grips handle 444 and moves it is the direction indicated by arrow 476. When handle 444 moves, it induces circular motion of sprocket chain 466 over the plurality of sprocket wheels, in a direction opposite to the direction described herein with respect to FIG. 9A. As sprocket chain 466 moves, it turns the combiner sprocket wheel along with combiner pivot 442 and static pivot 440. As a result, combiner 428 folds down relative to combiner deployment mechanism 426. This motion continues until the tapering heads of positioning pins 450 and 452 are located opposite to the respective first position slots $460_1$ and $464_1$, simultaneously.

Figure 10C:
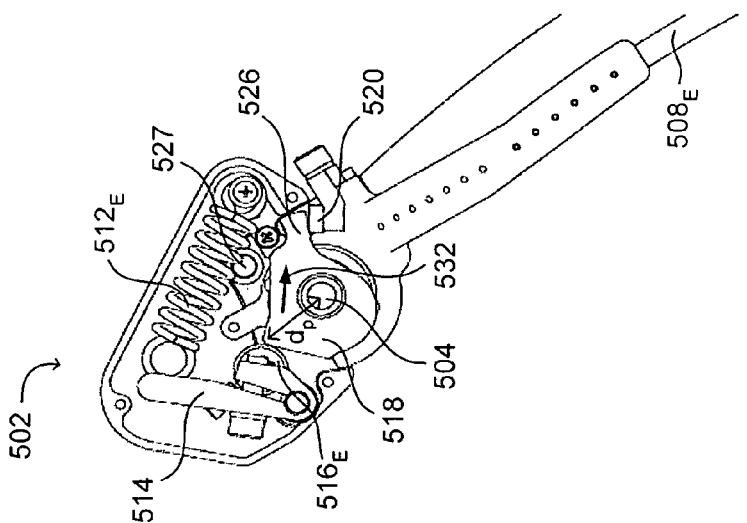
FIG. 10C is a sectional side view of the emergency mechanism of FIG. 10A, wherein the combiner is in the emergency position.
Figure 10B:
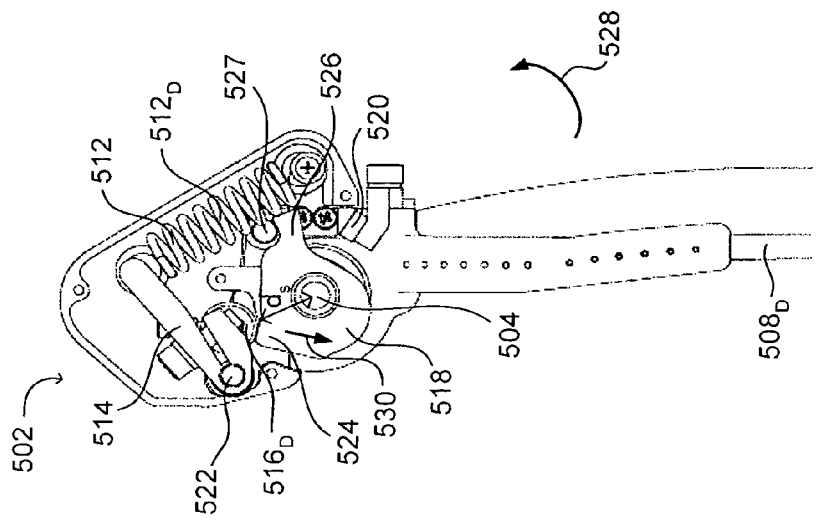
FIG. 10B is a sectional side view of the emergency mechanism of FIG. 10A, wherein the combiner is deployed.
Figure 10A:
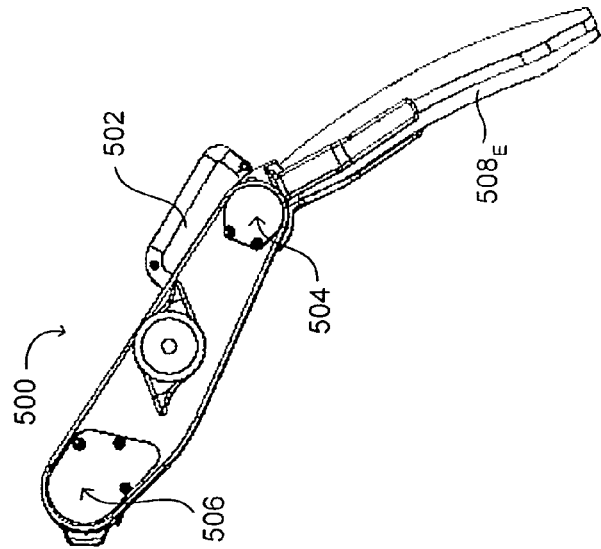
FIG. 10A is a schematic side view of a HUD combiner deployment mechanism in an emergency configuration, constructed and operative in accordance with a further embodiment of the disclosed technique.

Reference is now made to FIGS. 10A, 10B and 10C. FIG. 10A is a schematic side view of a HUD combiner deployment mechanism, generally referenced 500, in an emergency configuration, constructed and operative in accordance with a further embodiment of the disclosed technique. FIG. 10B is a sectional side view of the emergency mechanism of FIG. 10A, wherein the combiner is deployed. FIG. 10C is a sectional side view of the emergency mechanism of FIG. 10A, wherein the combiner is in the emergency position.

HUD combiner deployment mechanism 500 is similar to combiner deployment mechanism 426 of FIGS. 7, 8A, 8B, 9A and 9B. HUD combiner deployment mechanism 500 is a dynamic arm, movable between a deployed position and an emergency position. HUD combiner deployment mechanism 500 includes an emergency mechanism 502, a cam pivot 504 on the one end thereof and a static pivot 506 on the other end thereof. Emergency mechanism 502 is pivotally coupled with HUD combiner deployment mechanism 500, through cam axis 504. Combiner $508_E$ is firmly coupled with emergency mechanism 502

With reference to FIG. 10B, emergency mechanism 502 is in the deployed configuration. Emergency mechanism 502 includes an extension spring 512, a lever 514, a cam follower $516_D$, a cam 518, an emergency stopper 520, a deployed stopper 527, and a lever rotation axis 522. Cam pivot 504 passes through cam 518. Spring 512 is firmly coupled with a frame (not shown) of emergency mechanism 502, on the one end thereof. The other end of spring 512 is further coupled with one end of lever 514. The other end of lever 514 is further firmly coupled with cam follower $516_D$. Lever 514 may be clamped on a lever rotation axis 522. Lever rotation axis 522 is coupled with the frame of emergency mechanism 502. Cam 518 is firmly coupled with HUD combiner deployment mechanism 500. Cam 518 includes a tapering section 524, and a stopping arm 526. Stopping arm 526 extends out of cam 518.

When combiner $508_D$ is in the deployed configuration, cam follower $516_D$ is pressed against one side of tapering section 524. Emergency stopper 520 and deployed stopper 527 are located on opposing sides of stopping arm 526. Cam follower $516_D$ applies a moment (i.e., torque) on cam 518, in the direction indicated by arrow 530, thereby pressing stopping arm 526 against deployed stopper 527.

In a state of emergency, the vehicle is advancing forward, and suddenly decelerates, causing the head of the vehicle operator to move forward, due to the inertia thereof. Similarly, the optical combiner tends to move forward due to the inertia thereof. For preventing an impact of the head of the vehicle operator with the HUD optical combiner, the emergency mechanism moves from the deployed configuration to the emergency configuration, as depicted in FIGS. 10A and 10C.

When the vehicle decelerates, cam follower $516_D$ rolls along the edge of tapering section 524, due to the inertia of combiner $508_D$. As long as the deceleration of the vehicle is smaller than a predetermined value (e.g., 9g, wherein g is the gravitational acceleration at the surface of the earth), spring $512_D$ prevents cam follower $516_D$ from passing the peak of tapering section 524, by applying sufficient backward force thereon. Once the deceleration of the vehicle is greater than the predetermined value, the force applied to cam 518, due to the inertia of combiner $508_D$, is greater than the force applied by spring $512_D$, such that cam follower $516_D$ may roll to the other side of first tapering section 524. In other words, the peak of tapering section 524 introduces a potential hill for cam follower $516_D$. Only when cam follower $516_D$ gains sufficient potential energy, can it roll over the potential hill of tapering section 524 and pass to the other side thereof.

With reference to FIG. 10C, the deceleration of the vehicle is greater than the predetermined value, and cam follower $516_E$ passes the potential hill introduced by the peak of tapering section 524. As cam follower $516_E$ advances toward the peak of tapering section 524, spring 512 gradually stretches. The extent of stretching of spring 512 depends on the distance between cam axis 504 and the location of the cam follower. When cam follower $516_E$ reaches the peak of tapering section 524, spring $512_E$ is stretched to the maximum, since the distance between cam axis 504 and the peak ($d_p$) is larger than the distance between cam axis and the first side of tapering section 524 ($d_s$). After cam follower $516_E$ passed the peak of tapering section 524, spring $512_E$ is released, since $d_p$ is larger than the distance (not shown) between cam axis and the other side of tapering section 524. Cam follower $516_E$ then applies a moment on cam 518, in the direction indicated by arrow 532, thereby inducing emergency mechanism 502 and combiner $508_E$ to rotate around cam axis 504 in a direction indicated by arrow 528.

Emergency mechanism 502 and combiner $508_E$ rotate, until stopping arm 526 contacts emergency stopper 520, and emergency stopper 520 prevents further rotation. Emergency stopper 520 may be constructed of an elastomer material, for softening the contact between stopping arm 526 and stopper 520. When the combiner is located in the emergency position $508_E$, it is located farther away from the head of the vehicle operator, toward the window (not shown) of the vehicle. In this manner, emergency stopper 520 and deployed stopper 526 determine the extent of rotation for combiner $508_E$ and for emergency mechanism 502.

When the vehicle operator wishes to reposition combiner $508_E$ in the deployed configuration $508_D$, he can pull the combiner toward him. Such pulling forces cam follower $516_E$ to roll to the one side of first tapering section 524, thereby applying reverse pressure on spring 512, until it is constricted as it was in the deployed configuration, before moving to the emergency configuration.

It will be appreciated by persons skilled in the art that the disclosed technique is not limited to what has been particularly shown and described hereinabove. Rather the scope of the disclosed technique is defined only by the claims, which follow.

The invention claimed is:

1. An emergency mechanism for moving an element in a vehicle from a deployed position to an emergency position in a state of emergency, said element being firmly coupled with said emergency mechanism, said emergency mechanism being pivotally coupled with a deployment mechanism of said element by a cam pivot, said emergency mechanism comprising:

a lever, having a first end and a second end;

a spring, having a first end and a second end, said first end of said spring firmly coupled with said emergency mechanism, said second end of said spring coupled with said first end of said lever;

a cam follower, coupled with said second end of said lever, a cam, firmly coupled with said deployment mechanism, said cam pivot passing through said cam, said cam further including:

a tapering section, having a first side and a second side, said cam follower being pressed against said first side of said tapering section when said element is in said deployed position, said cam follower being pressed against said second side of said tapering section when said element is in said emergency position;

a stopping arm, said stopping arm extending outward of said cam, distant from said tapering section;

a deployed stopper, located on the one side of said stopping arm, for stopping said emergency mechanism when said element is in said deployed position, and an emergency stopper, located on the other side of said stopping arm, for stopping said emergency mechanism when said element is in said emergency position, when in said state of emergency, said vehicle decelerates with a deceleration greater than a predetermined value, causing said cam follower to roll along an edge of said tapering section, said spring pressing said cam follower against said second side of said tapering section, thereby rotating emergency mechanism and said element around said cam pivot, until said stopping arm contacts with said emergency stopper, and said element is located away from an operator of said vehicle.

2. The emergency mechanism of claim 1, wherein said element is an optical combiner.

3. The emergency mechanism of claim 1, wherein said emergency stopper is constructed of an elastic material, for softening the contact between said emergency stopper and said stopping arm.

* * * * *